Sept. 22, 1925.  M. W. MOUNT, JR., ET AL  1,554,683
AIR TAKE-OFF DEVICE
Filed Sept. 24, 1924
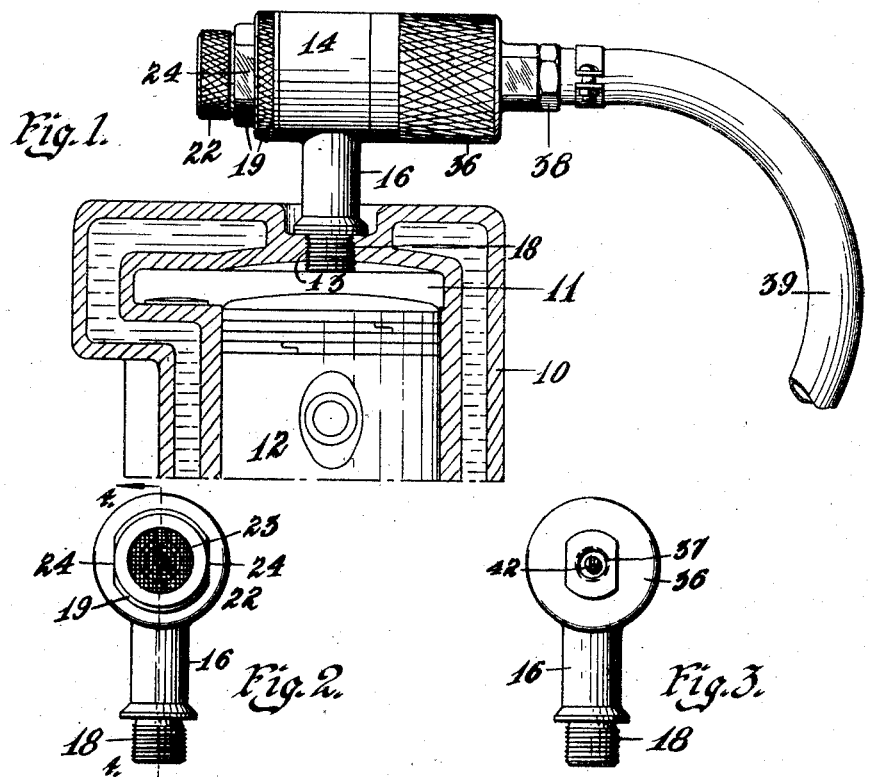
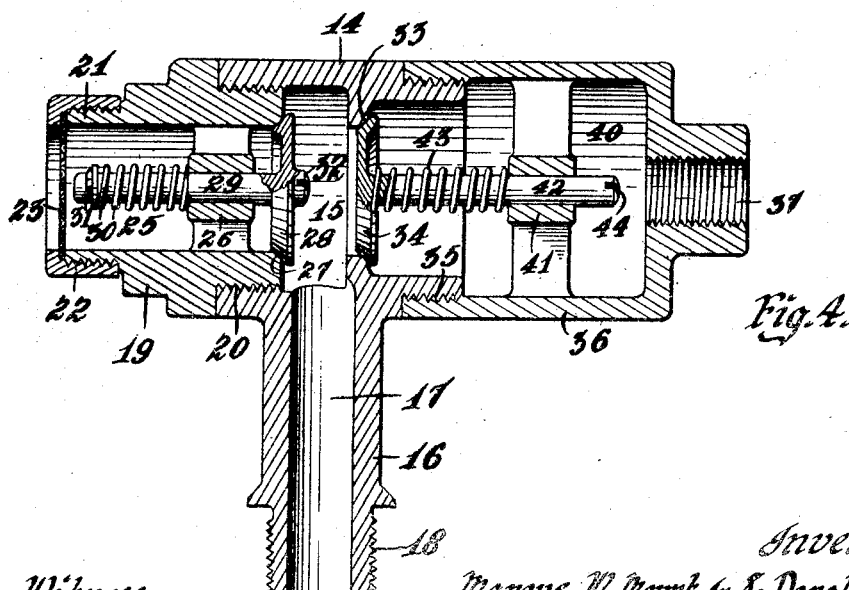
Witness
Inventors
Marcus W. Mount Jr. & Donald L. Mount
by Bair & Freeman Attorneys Patented Sept. 22, 1925.

1,554,683

UNITED STATES PATENT OFFICE.

MARCUS W. MOUNT, JR., AND DONALD L. MOUNT, OF MEMPHIS, MISSOURI.

AIR TAKE-OFF DEVICE.

Application filed September 24, 1924. Serial No. 739,738.

*To all whom it may concern:*

Be it known that we, MARCUS W. MOUNT, Jr., and DONALD L. MOUNT, citizens of the United States, residing at Memphis, in the county of Scotland and State of Missouri, have invented a certain new and useful Air Take-Off Device, of which the following is a specification.

The object of our invention is to provide an air take off device of simple, durable and comparatively inexpensive construction, whereby a pneuamtic hammer or tool, especially adapted for cutting marble or granite, may be operated from the take off device through the medium of an automobile or ordinary combustion engine.

More particularly our invention relates to a device having an air inlet passageway adapted to be closed by a valve member and a discharge passageway adapted to be closed by a valve member, the parts being so arranged that one valve member is closed when the other valve member is open during the operation of the combustion engine upon which our attachment is mounted.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figure 1 is a side view of our improved air take off device mounted upon a combustion engine, a portion of the combustion engine being shown in section to clearly illustrate the connection between our take off device and the engine.

Figure 2 is an end view of the device.

Figure 3 is also an end view showing the opposite end from that shown in Figure 2; and Figure 4 is a vertical, sectional view through the take off device, parts being clearly shown to better illustrate the construction thereof.

In the accompanying drawings, we have used the reference numeral 10 to indicate generally an automobile or other combustion engine, which is provided with a cylinder 11 and a piston 12.

A spark plug opening 13, which is screw threaded, is formed in the engine 10 and it is in this opening that our improved take off device is installed or mounted.

Our device consists of a main fitting 14 having a chamber 15 therein.

Formed integral with the fitting 14 is a pipe 16 having a passageway 17 in communication with the chamber 15.

The lower end of the pipe 16 is formed with screw threads 18, which coact with the screw threaded opening 13 whereby the device is secured to the engine 10.

A casing 19 is secured to the fitting 14 by means of the coacting screw threads 20 formed on the interior of the fitting 14 and on the exterior of a portion of the casing 19.

The casing 19 includes a screw threaded neck 21 upon which is mounted a sleeve 22 for retaining a wire mesh screen 23 in place, as clearly shown in Figure 4 of the drawings.

The casing 19 is formed with a pair of flattened sides 24 so that it may be engaged by a wrench for connecting or disconnecting it from the fitting 14.

The casing 19 is formed with a passageway 25 in communication with the chamber 15 and in this passageway is a bearing member 26, which is formed integral with the casing 19. The bearing member is supported by connecting webs to the casing itself, so as not to interfere with communication between the chamber 15 and the passageway 25.

On one end of the casing 19 and adjacent the chamber 15, we form a valve seat 27 which communicates with a valve member 28 mounted on the stem 29. The valve stem 29 is slidably mounted within the bearing 26 and has one end projected beyond the bearing 26 so as to permit a coil spring 30 to extend therearound between a cotter pin or the like 31 and the bearing member 26.

The spring 30 tends to normally hold the valve member 28 in closed position, that is, against the valve seat 27.

A screw head or the like 32 formed with a screw driver opening forms a part of the valve member 28 and by use of an ordinary screw driver, we are able to rotate the valve member 28 for getting it to properly seat against the valve seat 27.

The fitting 14 has a valve seat 33 formed therein which coacts with a valve member 34, as will hereinafter be more fully set forth.

The fitting 14 includes a screw threaded portion 35 upon which is mounted a casing 36.

The casing 36 has screw threads formed therebetween, which coact with the screw threaded portion 35 on the fitting 14.

The casing 36 is formed with an opening 37 interiorally screw threaded so that a pipe fitting 38 may be extended therein for connecting the same to an ordinary hose 39.

The casing 36 has a chamber 40 in communication with the chamber 15 when the valve member 34 is open.

A bearing 41 formed in the case 36 is similar in construction to the bearing 26 and has a valve stem 42 extended therethrough, which valve stem is formed integral with the valve member 34.

A coil spring 43 is positioned on the stem 42 between the bearing member 41 and the valve member 34.

A screw driver opening 44 is formed in the end of the stem 42 so that an ordinary screw driver may be inserted therein for properly seating the valve member 34 relative to the seat 33.

The hose 39 may be connected to an ordinary pneumatic hammer or chisel for cutting inscriptions on stone or the like.

From the construction of the parts just described, it will be seen that when the piston 12 is moved downward, it will cause the valve member 28 to be opened and at the same time to cause the valve member 34 to be more positively closed.

When the piston moves upward within the cylinder 11, then it will close the valve member 28 and cause the valve member 34 to be opened against the action of the spring 43.

We have used our device for operating a pneumatic hammer or chisel and have found it very convenient when cutting inscriptions on tomb stones after the tomb stones have been set up in the cemetery.

The automobile used for going to the cemetery can be utilized for operating the cutting tool through the medium of our take off device.

Some changes may be made in the construction and arrangement of the various parts of our invention, without departing from the real spirit and purpose of our invention and it is our intention to cover by our claim, any modified forms of structure or use of mechanical equivalents, which may be reasonably included within its scope.

We claim as our invention:

In a device of the class described, a main fitting having a pipe formed thereon provided with a screw threaded end adapted to extend into one of the cylinders of a combustion engine, a casing secured to said fitting, said casing having an inlet valve seat in one end thereof, a spring operated inlet valve member slidably mounted in said casing for coacting with said inlet valve seat, an outlet valve seat in said fitting, a second casing secured to said fitting, a spring operated outlet valve member slidably mounted in said second casing adapted to coact with said outlet valve seat, the valve members being arranged to both open in the same direction so that one valve member is seated when the other one is open during the operation of the combustion engine as and for the purposes stated.

Des Moines, Iowa, September 5, 1924.

MARCUS W. MOUNT, Jr.
DONALD L. MOUNT.